Patented Oct. 21, 1941

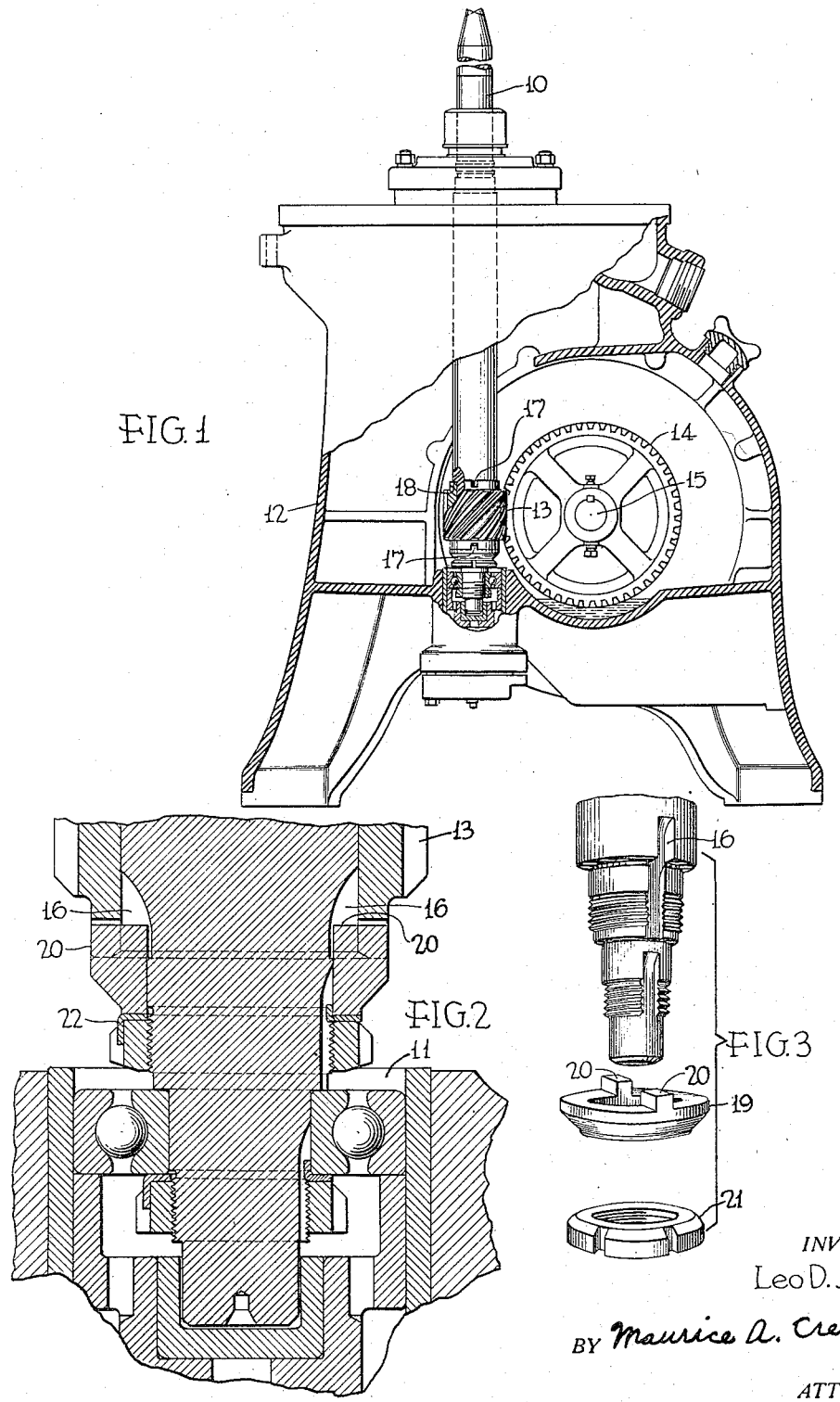

2,259,643

UNITED STATES PATENT OFFICE 2,259,643

CENTRIFUGAL MACHINE

Leo D. Jones, Philadelphia, Pa., assignor to The Sharples Corporation, Philadelphia, Pa., a corporation of Delaware Application December 11, 1939, Serial No. 308,584

1 Claim. (Cl. 287—53)

The present invention relates to an improved driving connection for a centrifugal separator.

It pertains particularly to a driving connection by which a worm secured to the rotor shaft drives that shaft by power derived from a worm wheel, which is in turn connected to a source of power. The problem of efficient securement of the worm to the rotor shaft in a connection of this character involves fulfillment of a number of requirements. In the first place, the means for securing the worm to the shaft must not require changes in the dimensions of the shaft which are of such character as to weaken the shaft materially. In the second place, a method of securement should be adopted which affords symmetrical arrangement of parts about the rotor axis, since substantial symmetry of the parts secured to the shaft is necessary to minimize vibration at the high speed of rotation. In the third place, it is desirable that the parts of the driving connection be sufficiently sturdy to avoid breakage, and that these parts be rigidly secured to the rotor shaft.

It has been an object of the present invention to provide a driving connection capable of fulfilling all of the above requirements.

The manner in which the above and other objects of the invention have been attained will be evident from a reading of the following specification in the light of the attached drawing, in which, Figure 1 is a side elevation of the base of the frame which supports a centrifugal rotor, with parts cut away to illustrate the interior features in section and elevation.

Figure 2 is a detailed cross section, illustrating the connection of the worm illustrated in Figure 1 to the shaft of the machine.

Figure 3 is a perspective view illustrating the members by which the worm is secured in position on the shaft, and the base of the shaft itself.

Referring to the drawing by reference numerals, the rotor (not shown) is secured to the upper end of the shaft 10, which is mounted for rotation in the bearing 11, secured in the frame 12. A worm 13 is secured to the shaft 10 for rotation therewith, and this worm is connected in driving relationship to a worm wheel 14, which is mounted on a shaft 15, the shaft 15 being connected to any suitable source of power (not shown). In the operation of the machine, the worm wheel 14 causes rotation of the worm 13, and this in turn results in rotation of the centrifugal rotor secured to the upper end of the shaft 10, to effect treatment of fluids passed through the rotor. The features of the present invention pertains to the means for securing the worm wheel 13 on the shaft 10 for rotation therewith. The shaft 10 is provided, in the zone designed for securement of the worm 13, with two grooves 16, symmetrically arranged on opposite sides of the shaft. The worm 13 is provided with grooves or slots 17 which register with the grooves 16 when the worm is properly positioned on the shaft 10. The end of the worm which is opposite to the end thereof which registers with the grooves 16 is provided with a similar pair of slots 17, and this end of the worm abuts against a shoulder 18 of the shaft.

In the assembly of the worm on the shaft, the upper end of the worm is pushed up against the shoulder 18, and the worm is rotated about the shaft until the grooves 16 and slots 17 register with each other. A washer 19 is employed for locking the shaft to the worm for rotation therewith. To accomplish this purpose, the washer is provided with a pair of tongues 20 on its upper side. When the washer 19 is pushed up into position beneath the assembly of the worm 13 on the shaft 10, with the grooves 16 and slots 17 registering as described above, the tongues 20 of the washer may be brought into registry with the grooves 16 and slots 17 as illustrated in Figure 2 of the drawing. The tongues 20 thus engage both the grooves 16 and slots 17, and cause rotation of these parts as a unit so long as the washer is held in position.

The washer 19 is retained in position by means of a nut 21, which may be secured to the shaft 10 below the zone of engagement of the washer 19 by means of a suitable lock washer 22.

In the operation of the machine, power is transmitted from worm wheel 14 to worm 13, and the engagement of the slots at the base of the worm 13 with the tongues 20 causes rotation of the washer 19 with the worm. The engagement of the inner portions of the tongues 20 with the grooves 16 in turn causes rotation of the shaft 10 with the washer, so that the worm 13 and shaft 10 rotate as a unit. Since the washer 19 abuts the lower end of worm 13 and pushes the upper end thereof against the shoulder 18, the worm will be held firmly in its proper position, regardless of whether power is being applied to the shaft 15, or whether such power has been cut off.

When the worm becomes worn it may be reversed by simply removing the nut 21 and washer 19, thereby permitting the worm 13 to be slipped from the shaft 10 and reinserted on that shaft with the slots which had been previously engaged with the tongues 20 uppermost. Upon reassembly of the parts, the tongues 20 will engage the grooves 16 and the slots 17 on the end of the worm which had previously been uppermost.

Modifications of the invention will be obvious to those skilled in the art, and I do not therefore wish to be limited except by the scope of the subjoined claim.

I claim:

A power transmitting connection between a rotary shaft having a shoulder and a bearing portion at one end thereof and a member located on said shaft beyond said bearing portion with one end thereof in abutment with said shoulder, said connection including a longitudinal groove in the face of said shaft, a radial slot in the other end of said member in registration with said groove, a washer provided with a projection adapted to enter said groove in said shaft and the registering slot in said member, and means for holding said washer in position on said shaft with said projection entering in said registering groove and slot.

LEO D. JONES.